US 11,608,390 B2

(12) United States Patent
Pollard et al.

(10) Patent No.: US 11,608,390 B2
(45) Date of Patent: Mar. 21, 2023

(54) METHOD AND SYSTEM FOR POLYMER PRODUCTION

(71) Applicant: Dow Global Technologies LLC, Midland, MI (US)

(72) Inventors: Maria Pollard, Pearland, TX (US); Robert D. Swindoll, Clute, TX (US); Pradeep Jain, Lake Jackson, TX (US); Alec Y. Wang, Sugar Land, TX (US); Jorge Rubalcaba, Pearland, TX (US); Shrikant Dhodapkar, Lake Jackson, TX (US); Sean W. Ewart, Pearland, TX (US); Bradley K. Blanchard, Baton Rouge, LA (US); George W. Haun, Jr., Baton Rouge, LA (US); Michael J. Zogg, Jr., Houston, TX (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 0 days.

(21) Appl. No.: 17/059,704

(22) PCT Filed: May 30, 2019

(86) PCT No.: PCT/US2019/034609
§ 371 (c)(1),
(2) Date: Nov. 30, 2020

(87) PCT Pub. No.: WO2019/232185
PCT Pub. Date: Dec. 5, 2019

(65) Prior Publication Data
US 2021/0214470 A1 Jul. 15, 2021

Related U.S. Application Data

(60) Provisional application No. 62/678,629, filed on May 31, 2018.

(51) Int. Cl.
*C08F 2/01* (2006.01)
*C08F 2/06* (2006.01)
(Continued)

(52) U.S. Cl.
CPC ............... *C08F 2/06* (2013.01); *B01J 19/245* (2013.01); *C08F 2/01* (2013.01); *C08F 6/003* (2013.01);
(Continued)

(58) Field of Classification Search
USPC ....................................................... 528/501
See application file for complete search history.

(56) References Cited

U.S. PATENT DOCUMENTS 2,411,186 A 11/1946 Boeckeler
2,969,347 A 1/1961 Bellinger et al.
(Continued)

FOREIGN PATENT DOCUMENTS

CA 2223816 A1 7/1998
CA 2809718 A1 9/2014
(Continued)

OTHER PUBLICATIONS

Anonymous in IP.com; "Production of Dual Reactor Polyethylene With Increased Molecular Weight Distributions And/Or Increased Short Chain Branching Distributions"; 2017, 2 pages.
(Continued)

*Primary Examiner* — Fred M Teskin
(74) *Attorney, Agent, or Firm* — Cantor Colburn LLP

(57) ABSTRACT

Disclosed herein is a system for solution polymerization comprising a reactor system that is operative to receive a monomer and to react the monomer to form a polymer; a plurality of devolatilization vessels located downstream of the reactor system, where each devolatilization vessel operates at a lower pressure than the preceding devolatilization
(Continued)

vessel; and a heat exchanger disposed between two devolatilization vessels and in fluid communication with them, where the heat exchanger has an inlet port temperature of 100° C. to 230° C., an outlet port temperature of 200° C. to 300° C., an inlet port pressure of 35 to 250 kgf/cm² and an outlet port pressure of 20 to 200 kgf/cm²; and wherein the polymer solution remains in a single phase during its residence in the heat exchanger.

20 Claims, 7 Drawing Sheets

(51) Int. Cl.
  *C08F 6/00* (2006.01)
  *C08F 6/10* (2006.01)
  *C08L 23/08* (2006.01)
  *B01J 19/24* (2006.01)
(52) U.S. Cl.
  CPC . *C08L 23/0815* (2013.01); *B01J 2219/00092* (2013.01); *B01J 2219/00096* (2013.01); *B01J 2219/00103* (2013.01)

(56) References Cited

U.S. PATENT DOCUMENTS

| | | | |
|---|---|---|---|
| 3,014,702 | A | 12/1961 | Oldershaw et al. |
| 3,366,458 | A | 1/1968 | Jori |
| 3,738,409 | A | 6/1973 | Skidmore |
| 4,153,501 | A | 5/1979 | Fink et al. |
| 4,423,767 | A | 1/1984 | Hay, II et al. |
| 4,531,677 | A | 7/1985 | Suzuki et al. |
| 4,564,063 | A | 1/1986 | Tollar |
| 4,616,937 | A | 10/1986 | King |
| 4,753,535 | A | 6/1988 | King |
| 4,808,007 | A | 2/1989 | King |
| 4,808,262 | A | 2/1989 | Aneja et al. |
| 4,925,526 | A | 5/1990 | Havukainen |
| 5,084,134 | A | 1/1992 | Mattiussi et al. |
| 5,453,158 | A | 9/1995 | Cummings et al. |
| 5,977,251 | A | 11/1999 | Kao et al. |
| 6,420,516 | B1 | 7/2002 | Tau et al. |
| 6,627,040 | B1 | 9/2003 | Elsner et al. |
| 6,764,030 | B2 | 7/2004 | Habib et al. |
| 7,332,058 | B2 | 2/2008 | Reimers |
| 8,518,212 | B2 | 8/2013 | Taylor et al. |
| 9,345,985 | B2 | 5/2016 | Taylor et al. |
| 2004/0176561 | A1 | 9/2004 | Janeiro |
| 2004/0255780 | A1 | 12/2004 | Konig et al. |
| 2005/0022939 | A1 | 2/2005 | Reimers |
| 2005/0061481 | A1 | 3/2005 | Kandlikar |
| 2009/0087355 | A1 | 4/2009 | Ashe |
| 2009/0260604 | A1 | 10/2009 | Castano Gonzalez et al. |
| 2009/0273112 | A1 | 11/2009 | Boothe et al. |
| 2009/0308253 | A1 | 12/2009 | Washio |
| 2010/0203006 | A1 | 8/2010 | Taylor et al. |
| 2010/0267906 | A1 | 10/2010 | Arich De Finetti et al. |
| 2012/0116022 | A1 | 5/2012 | Lynch et al. |
| 2016/0145390 | A1 | 5/2016 | Schmidt et al. |
| 2021/0205729 | A1 | 7/2021 | Blanchard et al. |
| 2021/0215432 | A1 | 7/2021 | Pollard et al. |
| 2021/0246235 | A1 | 8/2021 | Pollard et al. |

FOREIGN PATENT DOCUMENTS

| | | |
|---|---|---|
| CN | 101979116 A | 2/2011 |
| CN | 202267394 U | 6/2012 |
| CN | 105925820 A | 9/2016 |
| CN | 206837535 U | 1/2018 |
| EP | 0226204 A2 | 6/1987 |
| EP | 0350217 A2 | 1/1990 |
| EP | 0413830 A1 | 2/1991 |
| EP | 0492802 A1 | 7/1992 |
| EP | 0226204 B1 | 3/1993 |
| EP | 2072540 A1 | 6/2009 |
| GB | 982598 A | 2/1965 |
| GB | 1135858 A | 12/1968 |
| GB | 1501816 A | 2/1978 |
| GB | 2273980 B | 1/1997 |
| JP | 2007303693 A | 11/2007 |
| WO | 9524252 A1 | 9/1995 |
| WO | 9736942 | 10/1997 |
| WO | 9932524 A1 | 7/1999 |
| WO | 0017244 A1 | 3/2000 |
| WO | 0121303 A1 | 3/2001 |
| WO | 0191877 A2 | 12/2001 |
| WO | 2004000891 A1 | 12/2003 |
| WO | 2006120177 A2 | 11/2006 |
| WO | 2011100129 A1 | 8/2011 |
| WO | 2014018892 A1 | 1/2014 |
| WO | 2014179045 A1 | 11/2014 |
| WO | 2019232183 A1 | 12/2019 |
| WO | 2019232185 A1 | 12/2019 |
| WO | 2019232185 A1 | 12/2019 |
| WO | 2019232289 A1 | 12/2019 |
| WO | 2019232290 A1 | 12/2019 |

OTHER PUBLICATIONS

International Search Report for International Application No. PCT/US2019/034607; International Filing Date May 30, 2019; dated Sep. 17, 2019, 5 pages.
International Search Report for International Application No. PCT/US2019/034609; International Filing Date May 30, 2019; dated Aug. 9, 2019, 6 pages.
International Search Report for International Application Serial No. PCT/US2019/034787; International Filing Date May 31, 2019; dated Jul. 24, 2019 (6 pages).
International Search Report for International Application Serial No. PCT/US2019/034788; International Filing Date May 31, 2019; dated Jul. 24, 2019 (6 pages).
Joshi, et al., "The Kenics static mixer: new data and proposed correlations", The Chemical Engineering Journal 59 (1995) pp. 265-271, Received Jun. 14, 1994, The Chemical Engineering Journal, Elsevier.
Oh et al.; "High Performance Metallocene Polyethylene Based on SK Innovation's Nexlene Technology"; Annual Technical Conference of the Society of Plastics Engineers; 70th, vol. 3; Jan. 2012, 5 pages.
Pilch et al.; "Use of Breakup Time Data and Velocity History Data to Predict the Maximum Size of Stable Fragments for Acceleration-Induced Breakup of a Liquid Drop"; Int. J. Multiphase Flow; vol. 13, No. 6; Jan. 1987, pp. 741-757.
Written Opinion for International Application No. PCT/US2019/034607; International Filing Date May 30, 2019; dated Sep. 17, 2019, 8 pages.
Written Opinion for International Application No. PCT/US2019/034609; International Filing Date May 30, 2019; dated Aug. 9, 2019, 9 pages.
Written Opinion for International Application Serial No. PCT/US2019/034787; International Filing Date May 31, 2019; dated Jul. 24, 2019 (11 pages).
Written Opinion for International Application Serial No. PCT/US2019/034788; International Filing Date May 31, 2019; dated Jul. 24, 2019 (9 pages).

METHOD AND SYSTEM FOR POLYMER PRODUCTION

CROSS REFERENCE TO RELATED APPLICATIONS

This application is a National Stage application of PCT/US2019/034609, filed May 30, 2019, which claims the benefit of U.S. Provisional Application No. 62/678,629, filed May 31, 2018, both of which are incorporated by reference in their entirety herein.

BACKGROUND

This disclosure relates to a method and a system for producing polymers. In particular, this disclosure relates to a method and a system for manufacturing polyolefin copolymers having high molecular weights in high concentrations in solution.

Polyolefins and polyolefin copolymers are used in a wide variety of articles of commerce such as packaging for foods, films, utensils, automotive components, and the like. U.S. Pat. No. 6,420,516 to Tau details a reaction system for manufacturing polyolefin copolymers with an increased polymer recovery capacity. FIG. 1 is a schematic diagram of a solution process which includes a reaction section, solvent flashing, recovery and recycling section, and polymer product finishing section. The reaction system can comprise one or more reactors, adiabatic or isothermal or combinations thereof, in series or parallel configurations. FIG. 1 depicts two reactors—a first stage reactor 40 and a second stage reactor 42 in series with one another. The reactors can be continuously stirred tank reactors (CSTR), loop reactors, boiling reactors or any other reactor for making polyolefins, and can be single or multi-stage reactors.

An interim polymer solution produced in the first stage reactor 40 passes from the first reactor 40 to the second reactor 42 through a connecting line 46. The interim polymer solution has a polymer content from 3 percent to 30 percent by weight at the temperature of the first stage reactor 40. The polymer solution from the second stage reactor 42 has a polymer content from 5 percent to 40 percent by weight at the temperature of the second reactor, preferably 15 to 30 percent by weight. The polymer is insoluble at room temperature and soluble at the reactor temperatures. A feed line 48 optionally feeds raw materials and/or catalyst(s) directly to the second stage reactor 42 to provide additional attributes to the polymer product.

The polymer solution from the second stage reactor 42 is mixed in a mixer 43 with additives designed to pacify the catalyst and stabilize the polymer. Alternatively, other additives may be added to the polymer solution in the mixer 43. The polymer solution is then heated in a first stage heat exchanger 44 from which it passes through a discharge line 50 to a flashing vessel 52 (also known as a first stage devolatilization vessel 52). The reduction in pressure in the flashing vessel 52 allows highly volatile components, such as solvent and unreacted monomer and comonomers, to vaporize. Volatile components exit the flashing vessel 52 through a vapor discharge line 56 for cooling, condensing and recycling. A concentrated polymer solution exits the flashing vessel 52 through a concentrate line 60 and is pumped to a polymer finishing unit 66.

Typically, the pressure in the flashing vessel 52 is greater than atmospheric pressure, but not so high as to prevent flashing. The flashing vessel 52 reduces the temperature of the polymer solution by reducing the pressure on the solution and allowing vaporization of the most volatile components. The polymer solution is cooled because, under adiabatic conditions, it provides a heat of vaporization that is effective to vaporize the most volatile components. The total thermal energy entering and exiting the flashing vessel 52 remains the same, assuming that substantial heat is not lost through the vessel walls, even though the temperature of the polymer solution drops. The concentrated polymer solution from the flashing vessel 52 is typically 50 percent to 95 percent by weight polymer, preferably at least 70 percent to 92 percent by weight polymer, and most preferably 80 percent to 90 percent by weight polymer. The polymer dissolved in the solvent is substantially unchanged by the flashing vessel 52.

The polymer finishing unit shown in FIG. 1 includes a second stage heat exchanger 62 which passes the concentrated polymer solution through an entry line 64 to a second stage devolatilization vessel 66. A polymer product exits the devolatilization vessel 66 through a product line 68 and volatile solvent vapor exits the devolatilization vessel 66 through a recycle line 70. The polymer finishing unit reduces the solvent content of the concentrated polymer solution to a sufficiently low level that the polymer may be pelletized. Typically, the finished polymer contains no more than 2000 ppm, preferably no more than 1500 ppm, more preferably no more than 1000 ppm, and most preferably no more than 500 ppm. While the finished polymer may be characterized as having only traces of residual solvent, it has at least 50 ppm solvent, with solvent levels in excess of 100 ppm being more common.

Pellets can be purged with hot air to reduce the solvent to levels acceptable for specific customers. To prevent the pellets from softening to the point that they flow and adhere to each other the hot purge air temperature must be at least 15° C. lower than the bulk melting temperature ($T_m$) of the polymer. For high density polymers this approach is quite useful as hot air at 65° C. or greater can be used to effectively remove the residual solvent. However, this treatment cannot be performed on pellets with $T_m$ approaching ambient temperature, for example elastomers that have $T_m$ in the range of 30 to 50° C. Using hot air to purge these polymers will cause these pellets to soften, flow, and adhere to each other due to their low densities. If the pellets were purged at temperatures below 25° C. to avoid adhesion to each other, it would take an inordinate amount of time to achieve the desired solvent level, rendering this treatment unworkable. It is therefore desirable to use different separation methods when producing elastomeric polymers that have bulk melting temperatures less than approximately 80° C.

In addition to the aforementioned technical requirements for low Tm polymers, environmental regulations aimed at reducing the emissions of volatile organic compounds and, especially, highly reactive volatile organic compounds (HR-VOC) have increasingly become more stringent. In view of these issues, it is desirable to make process design modifications that reduce the solvent levels in the polymer melt, prior to granulation and solidification, to overcome both product quality and air-permit issues.

SUMMARY

Disclosed herein is a system for solution polymerization comprising a reactor system that is operative to receive a monomer and to react the monomer to form a polymer; a plurality of devolatilization vessels located downstream of the reactor system, where each devolatilization vessel operates at a lower pressure than the preceding devolatilization vessel; and a heat exchanger disposed between two devolatilization vessels and in fluid communication with them, where the heat exchanger has an inlet port temperature of 120° C. to 230° C., an outlet port temperature of 200° C. to 300° C., an inlet port pressure of 35 to 250 kgf/cm² and an outlet port pressure of 20 to 200 kgf/cm²; and wherein the polymer solution remains in a single phase during its residence in the heat exchanger.

Disclosed herein too is a method comprising charging a reactor system with a monomer, a solvent and a catalyst; reacting the monomer to form a polymer; wherein the reaction to form the polymer is conducted either adiabatically or isothermally and wherein the polymer is dispersed in a polymer solution; discharging the polymer solution from the reactor system to a plurality of devolatilization vessels located downstream of the reactor system; wherein each devolatilization vessel operates at a lower pressure than the preceding devolatilization vessel; and discharging the polymer solution from at least one devolatilization vessel to a heat exchanger; heating the polymer solution in the heat exchanger; where the heat exchanger receives the polymer solution at an inlet port temperature of 120° C. to 230° C., an outlet port temperature of 200° C. to 300° C., an inlet port pressure of 50 to 150 kgf/cm² and an outlet port pressure of 30 to 100 kgf/cm²; and wherein the polymer solution remains in a single phase during its residence in the heat exchanger.

DETAILED DESCRIPTION

Definitions

Figure 1:
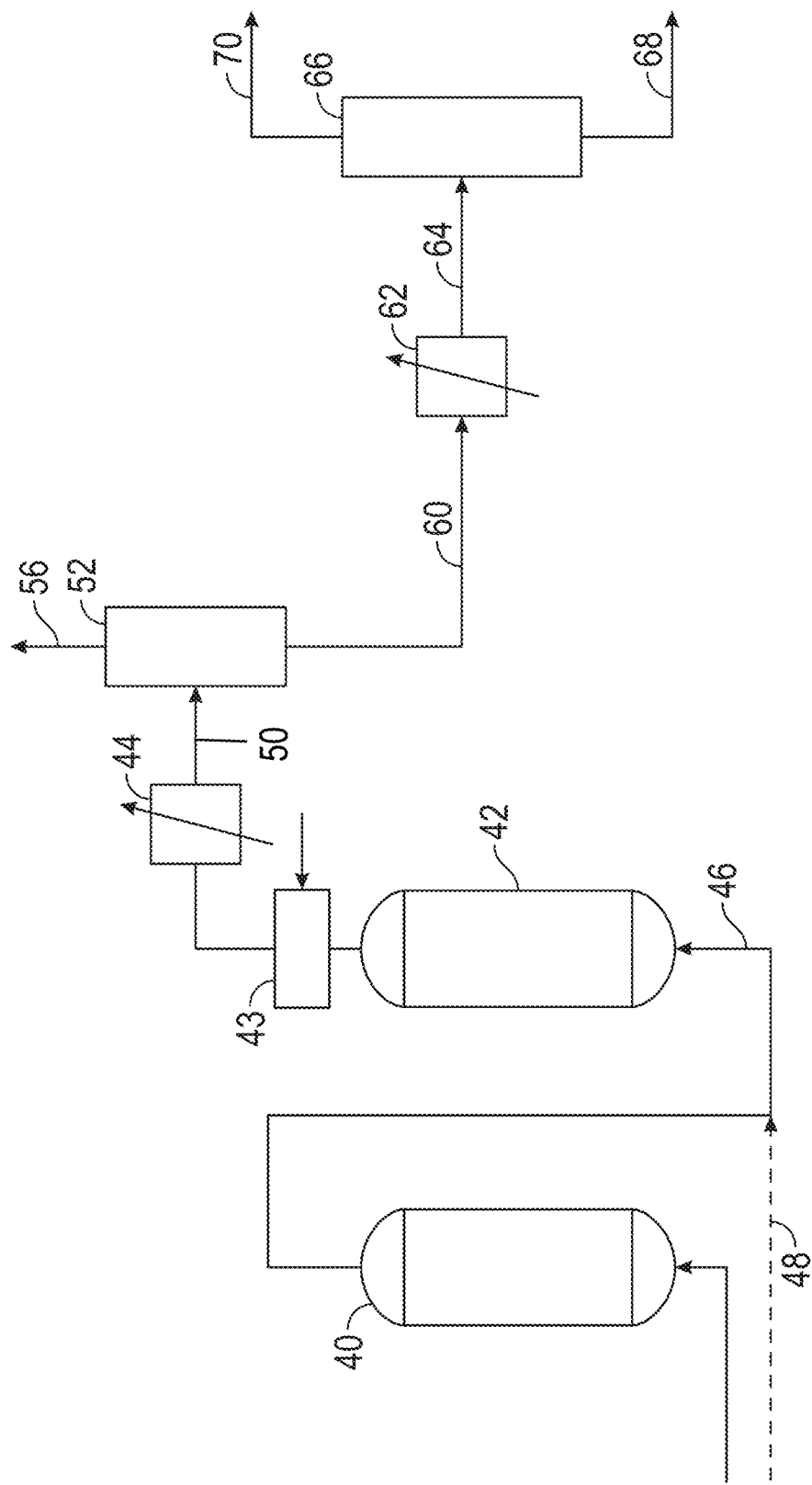
FIG. 1 is a schematic diagram of the reaction system having an adiabatic flash unit for flashing the polymer solution.

The term "continuous stirred-tank reactor," or "CSTR," as used herein, refers to a tank reactor to which reactants are continuously fed and product is continuously withdrawn. The CSTR is mechanically agitated such that there is a close approximation of perfect back mixing.

The term "boiling reactor," as used herein, refers to a reactor operated at conditions such that both a liquid phase and a vapor phase are present. At least part of the solvent and monomer introduced into the reactor as a liquid are vaporized and exit the reactor as a vapor, thereby removing part of the heat of polymerization which results in a higher polymer concentration, as compared to an adiabatic reactor, in the liquid stream that exits the reactor. The vapor stream that exits the reactor is cooled and recycled to the reactor. Any liquid that is condensed in this cooling process is also recycled to the reactor. These reactors are typically well mixed and can be mixed simply by the introduction of the vapor recycle stream; however the mixing can be augmented by means of mechanical agitation. The boiling reactor can be used by itself or in combination with other boiling reactors, CSTRs, loop reactors, or any other reactor for making polyolefins, and can be a single or multi-stage reactor.

A variation of the CSTR is the loop reactor which comprises a conduit through which process fluids are recirculated. Often it also contains one or multiple heat exchangers, a recirculation pump, and an injection device for reactants and catalyst. The heat exchangers in the loop reactors can be shell and tube, shell and tube with mixing element inserts, plate and frame, or flat plate type exchangers.

The term "tubular reactor" is meant to describe a reactor that is in the shape of a simple tube. The tubular reactor of this invention will have a length/diameter (L/D) ratio of at least 10/1. The tubular reactor may or may not be agitated. The tubular reactor may be operated adiabatically or isothermally. When operated adiabatically, as polymerization progresses, the remaining comonomer is increasingly consumed and the temperature of the solution increases (both of which improve the efficiency of separating the remaining comonomer from the polymer solution). It is especially preferred that the temperature increase along the length of the tubular reactor is greater than 3° C. (i.e., that the discharge temperature from the tubular reactor is at least 3° C. greater than the discharge temperature from the reactor that feeds the tubular reactor).

The tubular reactor used in this disclosure may have a feed port for additional ethylene, hydrogen, and solvent. The feed may be "tempered"—i.e., the temperature of the additional ethylene, hydrogen, and/or solvent is heated to above ambient (preferably to about 100° C.) but the temperature is below the discharge temperature of the tubular reactor. In an embodiment, the ethylene is tempered to between 100 and 200° C. It is also desirable to add the ethylene and hydrogen with solvent. The amount of solvent (expressed as a weight ratio, based on ethylene) is preferably from 10/1 to 0.1/1, especially from 5/1 to 1/1.

The term "adiabatically flashed," as used herein, refers to a flashing step in which no heat is added to the polymer solution between the reactor or reactors and the flashing vessel.

By "substantially uniform," as used with respect to a dimension (such as width or height) or a cross-sectional area of zone within a heating channel, is meant that the same is either not converging nor diverging at all, or is converging and/or diverging by no more than ten percent of the average of that dimension.

The term "solids content" refers to the amount of polymer in the polymer solution. The term "polymer concentration" is used interchangeably with "solids content" when referring to the concentration of the polymer in the polymer solution.

"Polymer" refers to a compound prepared by polymerizing monomers, whether of the same or a different type of monomer. The generic term "polymer" embraces the terms "oligomer," "homopolymer," "copolymer," "terpolymer" as well as "interpolymer."

"Interpolymer" refers to polymers prepared by the polymerization of at least two different types of monomers. The generic term "interpolymer" includes the term "copolymer" (which is usually employed to refer to a polymer prepared from two different monomers) as well as the term "terpolymer" (which is usually employed to refer to a polymer prepared from three different types of monomers). It also encompasses polymers made by polymerizing four or more types of monomers.

"Oligomer" refers to a polymer molecule consisting of only a few monomer units, such as a dimer, trimer, tetramer or a polymer with fewer than 20 carbon atoms in its chain.

"Bubble point pressure" means the pressure at which the first bubble of vapor is formed at a given temperature.

"Polymer solution" means a solution containing a dissolved polymer where the polymer and the volatiles are in a single phase—a liquid phase.

Solution viscosities are measured using an Anton Paar MCR 102 rheometer made by Anton Paar Germany GmbH. The rheometer is equipped with a C-ETD300 electrical heating system. The cup-and-bob system (combination of concentric cylinders) comprises a 27 mm diameter cup and a 25 mm diameter bob to allow for 1 mm gap between the two. The bob is operated in rotational mode inside a 150 bar (approximately 153 kgf/cm$^2$)-pressure cell. Viscosity measurements are obtained at a pressure of 30 bar ((approximately 31 kgf/cm$^2$—obtained with a nitrogen atmosphere), a range of temperatures (150 to 250° C.), a range of polymer concentrations (20 to 90 weight percent), a range of shear rates (0.1 to >100 reciprocal seconds (s$^{-1}$)), and range of polymer molecular weights (15,000 to 200,000 g/mole). The solvent in all cases was ISOPAR™ E by ExxonMobil. The viscosity measurements obtained ranged from 100 to greater than 2,000,000 centipoise.

Disclosed herein is a solution polymerization system for manufacturing polymer solutions that contain a high polymer concentration at high polymer molecular weights. The system comprises a plurality of reactors in series with one another that are used for solution polymerization of one or more monomers to produce a polymer-solvent solution (hereinafter termed a polymer solution). At least one of the reactors facilitates the polymerization under isothermal conditions. The reactors are in fluid communication with an optional positive displacement pump, a heater and a devolatilization system that comprises at least 2 devolatilization vessels, preferably at least 3 devolatilization vessels. Each successive devolatilization vessel operates at a lower pressure than the preceding vessel. This arrangement reduces the volatile content in the polymer to less than 400 parts per million, preferably less than 300 parts per million and more preferably less than 100 parts per million prior to pelletization, granulation and solidification.

Figure 2:
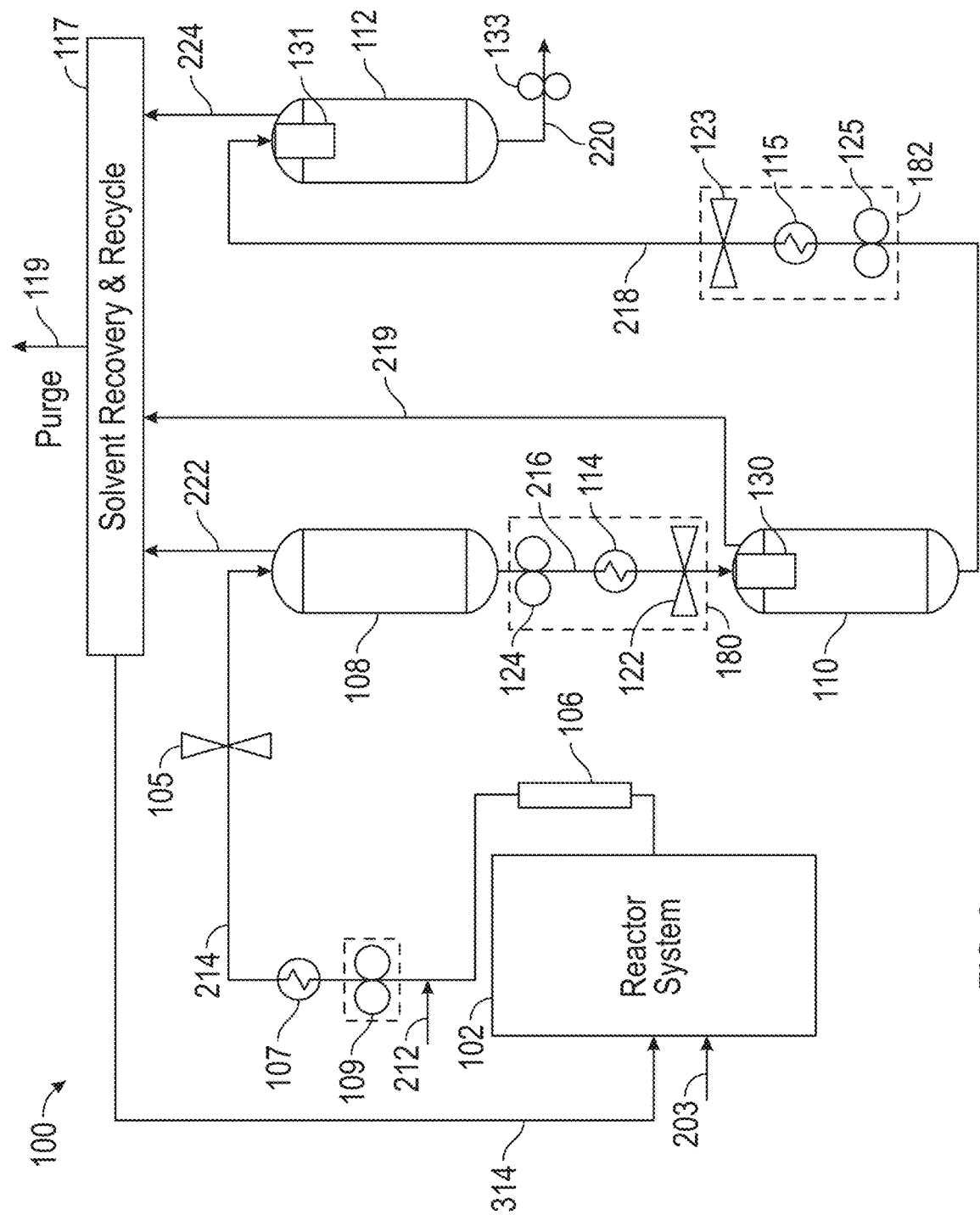
FIG. 2 is a schematic diagram of an exemplary solution polymerization system used for manufacturing polymer solutions that have a higher concentration of polymer in the solvent.

FIG. 2 is a schematic depiction of an exemplary solution polymerization system 100 (hereinafter system 100) that may be used to polymerize a monomer (or a plurality of monomers) to produce a polymer or copolymer. The system 100 comprises a reactor system 102 which can comprise a one or more reactor units (that are arranged either in series or in parallel) in fluid communication with each other. An example of such a reactor system is presented in U.S. Pat. Nos. 4,616,937, 4,753,535 and 4,808,007, the entire contents of which are hereby incorporated by reference. The reactor system 102 is operative to receive monomers, comonomers, hydrogen, catalyst, initiators, solvent, and the like via stream 203.

In an embodiment, the reactors in the reactor system 102 may be continuous stirred tank reactors (CSTRs), loop reactors (e.g., single loop reactor, double loop reactor), boiling reactors, and can be single or multi-stage reactors. In an embodiment, this process may employ multiple catalysts in one or more reactors.

In an embodiment, when the system employs multiple reactors, these reactors may all be the same type (e.g., all reactors may be loop reactors or all reactors may be continuous stirred tank reactors). In another embodiment, the reactors may be different reactor types (e.g., one reactor may a loop reactor while the other reactor may be a continuous stirred tank reactor) or combinations thereof. In an embodiment, at least one of the reactors is an adiabatic reactor, i.e., no heat is supplied to the reactor during the reaction. In another embodiment, at least one of the reactors is an isothermal reactor with the heat of reaction (generated in the reactor) being removed in one or more heat exchangers that are present within the isothermal reactor. In one embodiment, the heat exchangers may be a shell and tube heat exchanger, a shell and tube heat exchanger with mixing element inserts, a plate and frame heat exchanger, or a flat plate cooler.

In an embodiment, the heat exchangers may be shell and tube exchangers when the reactor system comprises at least one loop reactor. In another embodiment, the heat exchangers may be shell and tube exchangers with twisted tape mixing elements when the reactor system comprises at least one loop reactor. In yet another embodiment, the heat exchangers may be flat plate exchangers when the reactor system comprises at least one loop reactor.

In one embodiment, the flat plate exchanger comprises a shell within which is disposed a plurality of plates stacked one over the other, where a pair of neighboring plates (along with the associated walls) when in contact with one another form a plurality of radially disposed conduits that facilitate transporting the polymer solution from the center of the shell to the outside of the shell or alternatively from the outside to the center of the shell while lowering its temperature or keeping its temperature constant by removing the heat of polymerization and simultaneously reducing its pressure.

The exchanger may alternatively be described as a flat plate heat exchanger where the plates are suspended in a cylindrical shell. In an embodiment, the flat plate cooler comprises an inlet port located at one end of the shell through which the polymer solution is charged to the cooler and an outlet port located at another end of the shell through which the polymer solution is removed, and wherein the inlet port and outlet port are not in direct communication with one another, forcing the polymer solution to travel along the periphery of the exchanger and through the conduits; wherein the conduits are being cooled using a cooling fluid such as water.

Located downstream of the reactor system 102 are a plurality of devolatilization vessels in series with one another—a first devolatilization vessel 108, a second devolatilization vessel 110 and a third devolatilization vessel 112 that are in fluid communication with the reactor system 102 and with one another.

Disposed between the reactor system 102 and the first devolatilization vessel 108 is an optional tubular reactor 106, an optional pump 109 that facilitates increasing the pressure of the stream 214 prior to entering an optional heater 107 that facilitates increasing the temperature of the polymer solution.

The tubular reactor 106 is in fluid communication with the reactor system 102. The tubular reactor 106 may optionally receive additional monomer, comonomer, hydrogen and catalyst. The tubular reactor 106 further increases the polymer concentration via further reaction of unreacted or optionally the additional monomer and/or comonomer.

In an embodiment, the pump 109 is a screw pump. In another embodiment, the pump 109 is a gear pump. In an embodiment, the heat exchanger is a shell and tube exchanger. In another embodiment, the heat exchanger is a plate and frame heat exchanger. In another embodiment, the heat exchanger is a flat plate heat exchanger.

Disposed between the heat exchanger 107 and the first devolatilization vessel 108 is a pressure regulator 105 that controls the pressure in the system up to the location of the pressure regulator 105 and allows for the pressure to drop to the desired level in the first devolatilization vessel 108.

Disposed between any two of the devolatilization vessels is a first heat exchanger 114 that facilitates increasing the temperature of the polymer solution while retaining it in a single phase during the polymer solution's residence in the heater. In an embodiment, the first heat exchanger 114 is a plate and frame exchanger or a flat plate heat exchanger. Keeping the polymer solution single-phase is useful for effective heat transfer.

Disposed on the inside of any of the devolatilization vessels is a distributor 130/131 that facilitates increasing surface area for mass transfer and separation of the polymer stream to separate the polymer from the volatiles. Any design that can increase the area for mass transfer can be used as a distributor. In an embodiment, the distributor comprises a first conduit that has an inlet port for charging a heating fluid into the distributor and an outlet port for removing the heating fluid from the distributor. In an embodiment, the distributor further comprises a second conduit for charging the polymer solution into the distributor.

A plurality of plates is disposed around the second conduit to define an annular space from top to bottom of the distributor. In one embodiment, a portion of the plurality of plates can form a stack. In one embodiment, each successive plate stack has smaller inner diameter than the plate stack located above it, thus forming the narrowing second annular space from top to bottom of the distributor. In one embodiment, the plurality of plate stacks may increase, decrease or stay the same in their outside diameter.

Each plate when placed atop one another (i.e., two successive plates placed atop one another) define a plurality of radially extending conduits that extend from the second annular space to the outer periphery of the plates. Each conduit having a varying width over its length. In an embodiment, the distributor is operated at a pressure and a temperature effective to promote separation of a solvent from a polymer solution during transport of the polymer solution through the distributor.

In an exemplary embodiment, the first heat exchanger 114 is disposed downstream of the first devolatilization vessel 108 and upstream of the second devolatilization vessel 110. In another exemplary embodiment, a second heat exchanger 115 is disposed downstream of the second devolatilization vessel 110 and upstream of the third devolatilization vessel 112.

Solution processes for the copolymerization of ethylene and an alpha olefin having 3 to 12 carbon atoms are generally conducted in the presence of an inert hydrocarbon solvent. Illustrative examples of such alpha-olefin monomers are one or more of propylene, 1-butene, 1-pentene, 1-hexene, 1-octene and 1-decene. 1-octene is preferred.

Examples of inert hydrocarbon solvents include a $C_{5-12}$ hydrocarbon which may be unsubstituted or substituted by a $C_{1-4}$ alkyl group such as pentane, methyl pentane, hexane, heptane, octane, cyclohexane, methylcyclohexane and hydrogenated naphtha. An example of a suitable solvent which is commercially available is "ISOPAR® E" (C8-12 aliphatic solvent, Exxon Chemical Co.).

This process can be used for making olefin-based polymers, such as ethylene homopolymers, or interpolymers with other alkenes (for example, copolymers or terpolymers), and, optionally, a diene (for example an EPDM terpolymer). Catalysts used can be Ziegler-Nana catalysts, bis-metallocene catalysts, constrained geometry catalysts, a polyvalent aryloxyether complex, a phosphinimine, or a combination thereof.

The monomers are mixed with hydrogen and dissolved/dispersed in the solvent prior to being fed to the reactor system 102. Prior to mixing, the solvent and monomers (sometimes referred to as "feedstock") are generally purified to remove potential catalyst poisons such as water, oxygen, or other polar impurities. The feedstock purification may employ molecular sieves, alumina beds or oxygen removal catalysts. The solvent may also be purified in a similar manner. The feeds to the reactor system 102 are generally cooled down to a temperature of less than 40° C., preferably less than 20° C. The cooling of the feed can facilitate a reduction in heat exchanger size in the reactor system. The cooling can be conducted either in the reactor system or prior to entry into the reactor system. In a preferred embodiment, the cooling of the feed can be conducted prior to entry into the reactor system.

Generally, the catalyst components may be premixed in the solvent for the reaction or fed as separate streams to one or multiple reactors in the reactor system 102.

In an embodiment, the reactor system 102 operates at a pressure of greater than 40 kgf/cm$^2$, preferably greater than 45 kgf/cm$^2$, and more preferably greater than 50 kgf/cm$^2$. In an embodiment, the reactor system 102 operates at temperatures ranging from 120 to 230° C. In an embodiment, the polymer solution exiting the reactor system 102 can have temperatures of 130 to 240° C., preferably 180 to 210° C.

The polymer is present in the polymer solution in an amount of 10 to 30 wt %, preferably 15 to 25 wt %, at the exit of the reactor system 102. Melt indices $I_2$ (or I2) and $I_{10}$ (or I10), for ethylene-based polymers, are measured in accordance with ASTM D-1238 (method B) at 190° C. and at 2.16 kg and 10 kg load, respectively. Their values are reported in g/10 min. The melt index ratio (also called a melt flow ratio) $I_{10}/I_2$ is the ratio of the two values and it is dimensionless. The melt index of the polymer at the exit of the reactor system 102 can range from 0.1 to 1,500.

In an embodiment, the viscosity of the polymer solution exiting the reactor system 102 is 50 to 6,000 centipoise when measured as detailed above. Samples for density measurement are prepared according to ASTM D4703. Measurements are made, according to ASTM D792, Method B, within one hour of sample pressing. In an exemplary embodiment, the product exiting the reactor system 102 has density of 0.865 to 0.920 g/cm$^3$, a melt index $I_2$ of 0.25 to 210.0, and a melt flow ratio of $I_{10}/I_2$ of 6.0 to 8.5. At a reactor temperature of 160° C. and polymer concentration of 20 wt %, the solution viscosity at the reactor system exit is expected to be over 4,000 centipoise, measured as detailed above.

With reference now to the FIG. 2, the activity of the polymer solution is terminated or reduced substantially by adding a catalyst neutralizer (sometimes referred to as a hydrolyzer) to the polymer solution at port 212 located in stream 214 (located downstream of the reactor system 102). The catalyst neutralizer serves to reduce the catalyst activity to as close to zero as possible. An example of a catalyst neutralizer is water or alcohol and it is added to the polymer solution in an amount of 10 to 100 parts per million, based on the total weight of the polymer that is in solution.

A heat exchanger 107 and an optional positive displacement pump 109 are disposed downstream of the reactor system 102. In an embodiment, the positive displacement pump 109 lies downstream of the reactor system 102 and upstream of the heat exchanger 107. The positive displacement pump 109 increases the pressure of the polymer solution in order to facilitate keeping the polymer solution single-phase in the heat exchanger 107. The heat exchanger 107 is preferably a shell-and-tube heater that facilitates heating of the polymer solution, especially at start-up. In another embodiment, heat exchanger 107 is a flat plate heat exchanger. In an embodiment, the heat exchanger 107 may be the primary source of energy to the polymer solution for the devolatilization of solvent from the polymer solution. This devolatilization is conducted in the devolatilization stages that lie downstream of the heat exchanger 107.

When the heat exchanger 107 is used primarily to facilitate start-up of the solution polymerization system 100, it heats the polymer solution emanating from the reactor system 102 to a temperature of 200 to 260° C. When the heat exchanger 107 is used as the primary source of energy to the polymer solution (for the devolatilization of solvent in the subsequent devolatilization stages), it heats the polymer solution from the reactor system 102 to a temperature ranging from of at least 220 to 270° C.

In an embodiment, the increase in temperature of the polymer solution facilitated by the heat exchanger 107 permits the polymer solution to flash adiabatically in the first devolatilization vessel 108 and to produce a polymer solution that comprises 50 to 90 wt % polymer, based on the weight of the polymer solution. The viscosity of the polymer solution after the catalyst neutralization stage is 100 to 10,000 centipoise measured as detailed above.

The control valve 105 is designed to control the pressure in the reactor system and heat exchanger so as to keep the polymer solution in a single phase (liquid) up to the first devolatilization unit. It is preferred that the polymer solution remains single phase (liquid) in heat exchanger 107. In some cases, the polymer solution may become two liquid phases (a polymer-rich and a solvent-rich phase), but it is preferable to keep the polymer solution from forming a vapor phase.

The polymer solution is then discharged to a devolatilization system that comprises a series of devolatilization vessels—the first devolatilization vessel 108, the second devolatilization vessel 110 and the third devolatilization vessel 112, all of which are in serial fluid communication with one another. The first devolatilization vessel 108 is located upstream of the second devolatilization vessel 110, which is in turn located upstream of the third devolatilization vessel 112. In an embodiment, the first devolatilization vessel 108 is located at a higher altitude that the second devolatilization vessel 110. The pressure difference between the two devolatilization vessels 108 and 110 together with gravity facilitates discharging the concentrated polymer solution from the first devolatilization vessel 108 to the second devolatilization vessel 110. In an embodiment, the second devolatilization vessel 110 may also be located at a higher altitude than the third devolatilization vessel 112.

Each sequential devolatilization vessel operates at a lower pressure than the preceding vessel and each devolatilization vessel facilitates adiabatic flashing of the solvent from the polymer solution, leaving behind a polymer solution that has a higher polymer concentration than that prior to the flashing.

The polymer solution comprises about 15 to 40 wt % solids, preferably 25 to 30 wt % solids at the point of entry into the first devolatilization vessel 108. In the first devolatilization vessel 108, the polymer solution is subjected to an adiabatic flash where at least 60 wt % of the solvent is removed so that the solution is concentrated to at least 50 wt % polymer, based on the total weight of the polymer solution.

In one embodiment, the first devolatilization vessel 108 operates adiabatically to facilitate solvent removal from the polymer solution. If the system 100 contains no positive displacement pump 109 and no heat exchanger 107, the polymer solution entering the first devolatilization vessel 108 is at a temperature of 205 to 225° C., preferably 210 to 220° C., and a pressure of 50 to 70 kgf/cm$^2$. If the system 100 contains the positive displacement pump 109 and the heat exchanger 107, the polymer solution entering the first devolatilization vessel 108 is at a temperature of 260 to 280° C., preferably 265 to 275° C. and a pressure of 70 to 120 kgf/cm$^2$.

In one embodiment, the pressure in the first devolatilization vessel is maintained at 2 to 12 kgf/cm$^2$, permitting the solvent to flash off and to increase the polymer content in the polymer solution to 45 to 90 wt %, preferably 50 to 70 wt %, based on the total weight of the polymer solution. The temperature of the polymer solution leaving the first devolatilization vessel 108 is 170° C. to 220° C. and its pressure is at 2 to 12 kgf/cm$^2$. The polymer solution exiting the first devolatilization vessel 108 contains polymer in an amount of 50 to 90 wt %, based on the total weight of the polymer solution that exits the first devolatilization vessel 108.

The polymer solution is then discharged from the first devolatilization vessel 108 via stream 216 to an optional first positive displacement pump 124 and a first heat exchanger 114. The optional first positive displacement pump 124 facilitates increasing the pressure of the polymer solution while the first heat exchanger 114 facilitates heating the polymer solution to a temperature that is greater than the temperature at its inlet port. This increase in the pressure (brought about by the first optional positive displacement pump 124) and temperature (brought about by the first heat exchanger 114) facilitates further devolatilization of volatiles from the polymer solution when it is adiabatically flashed in the second devolatilization vessel 110 to increase the solids concentration to an amount greater than 90 wt %, based on the total weight of the polymer solution. If the positive displacement pump is not present, vessels 108 and 110 are placed in such a way as to rely on gravity and pressure difference to push the polymer solution from vessel 108 to vessel 110. In this case, valve 122 is optional.

In an embodiment, the optional first positive displacement pump 124 may be a gear pump or a screw pump that facilitates an increase in the pressure of the polymer solution entering the heat exchanger 114 from the pressure of vessel 108 to a pressure greater than 35 kgf/cm$^2$. In an embodiment, the optional first positive displacement pump 124 increases the pressure of the polymer solution entering the heat exchanger 114 to 35 to 140 kgf/cm$^2$.

In an embodiment, the first heat exchanger 114 is a flat plate heater that heats the polymer solution from a temperature of 140° C. to 240° C. to a temperature of 200° C. to 300° C. Details of the first heat exchanger 114 are provided in U.S. Provisional Patent Application No. 62/678,597, filed concurrently herewith, the entire contents of which are hereby incorporated by reference. The polymer solution can flow from top to bottom, or alternatively, from bottom to top in the first heat exchanger 114. The polymer solution can also flow from the inside core towards the outside of the exchanger slots, or alternatively, from the outside perimeter of the slots towards the inside core of the exchanger. FIGS. 3A, 3B, 3C and 3D include schematic depictions of the first heat exchanger 114 that are operated in a top-to-bottom and inside-out or outside-in flow configurations and a bottom-to-top and inside-out or outside-in flow configurations, respectively.

Figure 3A:
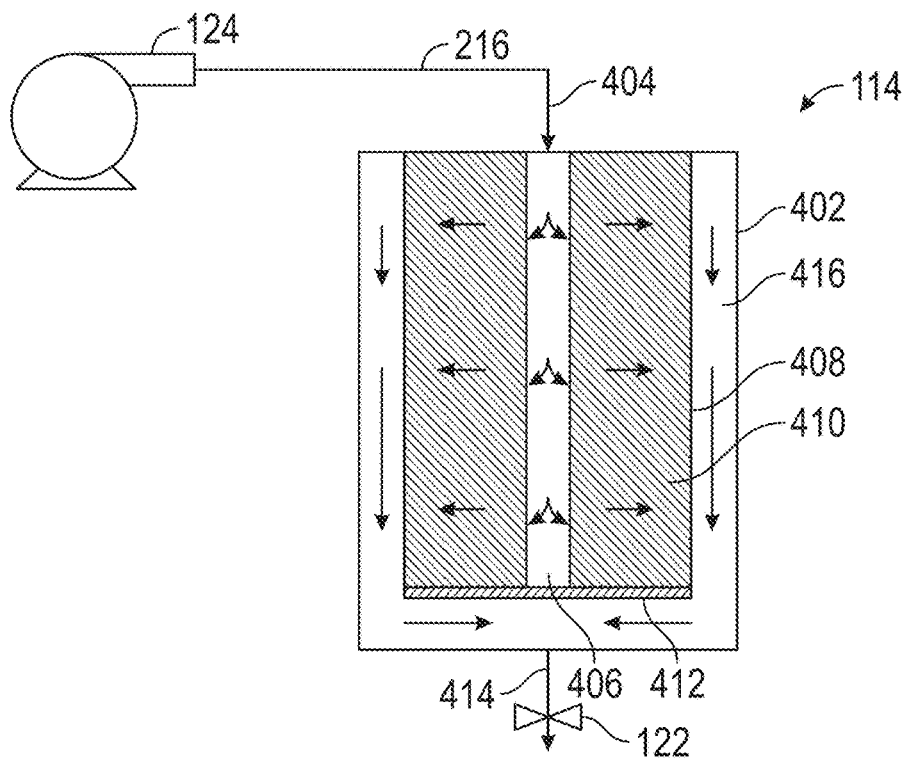
FIG. 3A is a schematic depiction of one embodiment of the heat exchanger.

FIG. 3A depicts an example of the first heat exchanger 114 (in a top-to-bottom, inside-out flow configuration) comprising a shell 402 with an inlet port 404 for introducing a polymer solution into the shell 402 and an outlet port 414 for removing the polymer solution from the shell. The FIG. 3A represents the portion 180 (shown in dotted lines) of the FIG. 2, which encompasses the pump 124, the first heat exchanger 114 and the first pressure regulation device 122. It can also represent the portion 182 (shown in dotted lines in the FIG. 2) of the FIG. 2, which encompasses a pump 125, and an optional second flat plate heater 115 and an optional second pressure regulation device 123 that are disposed downstream of the second devolatilization device 110 and upstream of the third devolatilization device 112. The functioning of the portions 180 and 182 are discussed in detail below.

The first heat exchanger 114 (See FIG. 3A) comprises a plurality of plates 408 where each of the plates are stacked one atop the other to define a central passage 406 that is in direct fluid communication with the inlet port 404 of the shell 402. A plate 412 prevents the direct flow of the polymer solution from the top to the bottom of the first heat exchanger 114.

The plurality of plates 408 (when stacked atop one another) further define a plurality of conduits 410 that extend radially outwards from the central passage 406 to the outer periphery of the plates. Located between the shell 402 and the periphery of the plates is an annular space 416 that permits a polymer solution to travel from the inlet port 404 to the outlet port 414 of the heat exchanger 114. In short, a polymer solution that enters the inlet port 404 of the heat exchanger 114 (when operating in a top-to-bottom flow configuration) is transported to the outlet port 414 via the central passage 406, the radial conduits 410 and the annular space 416 (in sequence). The polymer solution remains in a single phase during its entire travel through the heat exchanger 114. In an embodiment, the polymer solution remains in a liquid phase during its entire travel through the heat exchanger 114.

In summary, when the polymer solution flows from top to bottom of the heat exchanger 114, the solution enters at the inlet port 404 and is transported to the central passage 406. From the central passage 406, the solution is transported to the radially extending conduits 410 located in the plurality of plates 408. After exiting the radially extending conduits 410, the polymer solution travels through the annular space 416 and then exits the heat exchanger 114 via the outlet port 414.

Figure 3B:
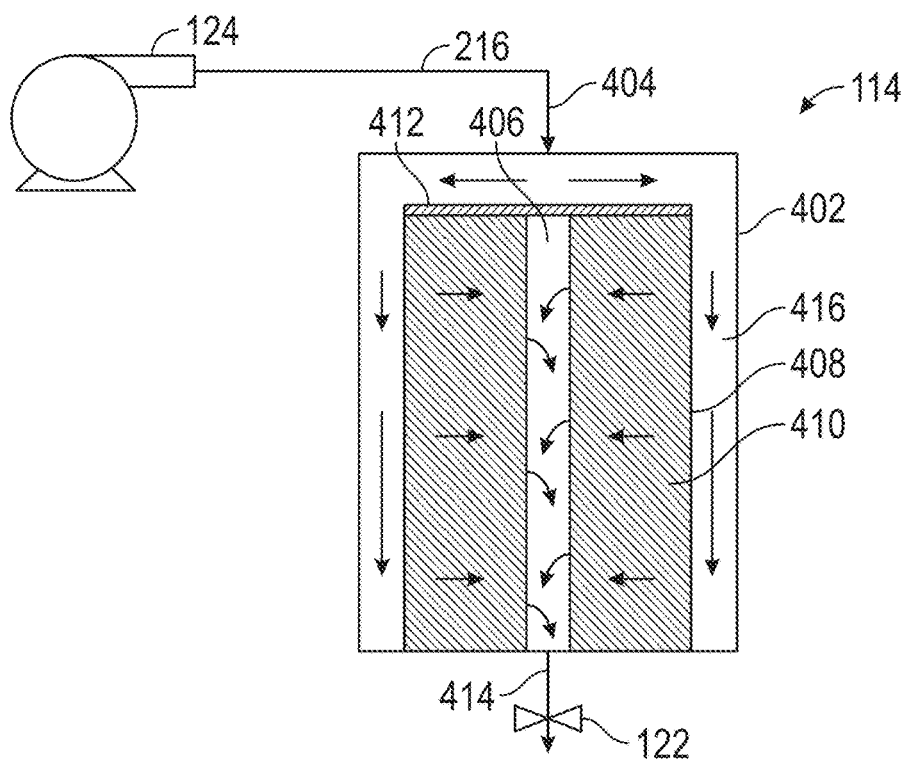
FIG. 3B is another schematic depiction of another embodiment of the heat exchanger.

FIG. 3B is another embodiment of a schematic depiction of the heat exchanger when it is deployed in the top-to-bottom, outside-in flow configuration. The solution enters at the inlet port 404 and is transported to the annular space 416. From the annular space 416, the solution is transported to the radially extending conduits 410 located in the plurality of plates 408. After exiting the radially extending conduits 410, the polymer solution travels through the central passage 406 and then exits the heat exchanger via the outlet port 414.

Figure 3C:
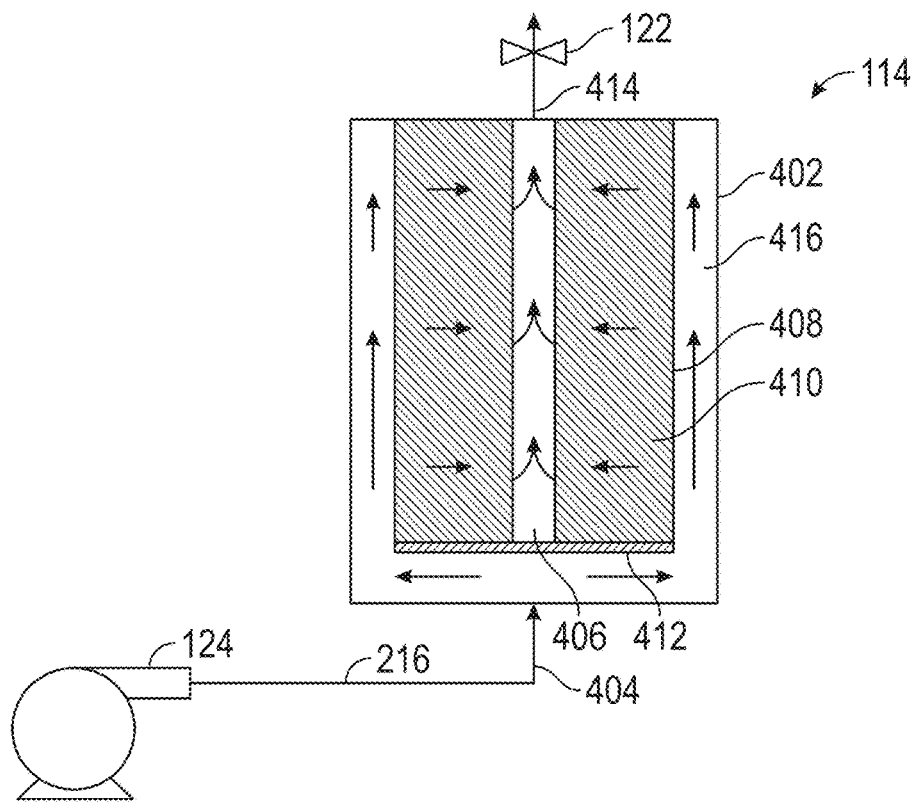
FIG. 3C is another schematic depiction of another embodiment of the heat exchanger.

FIG. 3C is a schematic depiction of the heat exchanger when it is deployed in the bottom-to-top flow, outside-in configuration. When the polymer solution flows from bottom to top of the heat exchanger 114, the solution enters at the inlet port 404 and is transported to the annular space 416. From the annular space 416, the solution is transported to the radially extending conduits 410 located in the plurality of plates 408. After exiting the radially extending conduits 410, the polymer solution travels through the central passage 406 and then exits the heat exchanger via the outlet port 414.

Figure 3D:
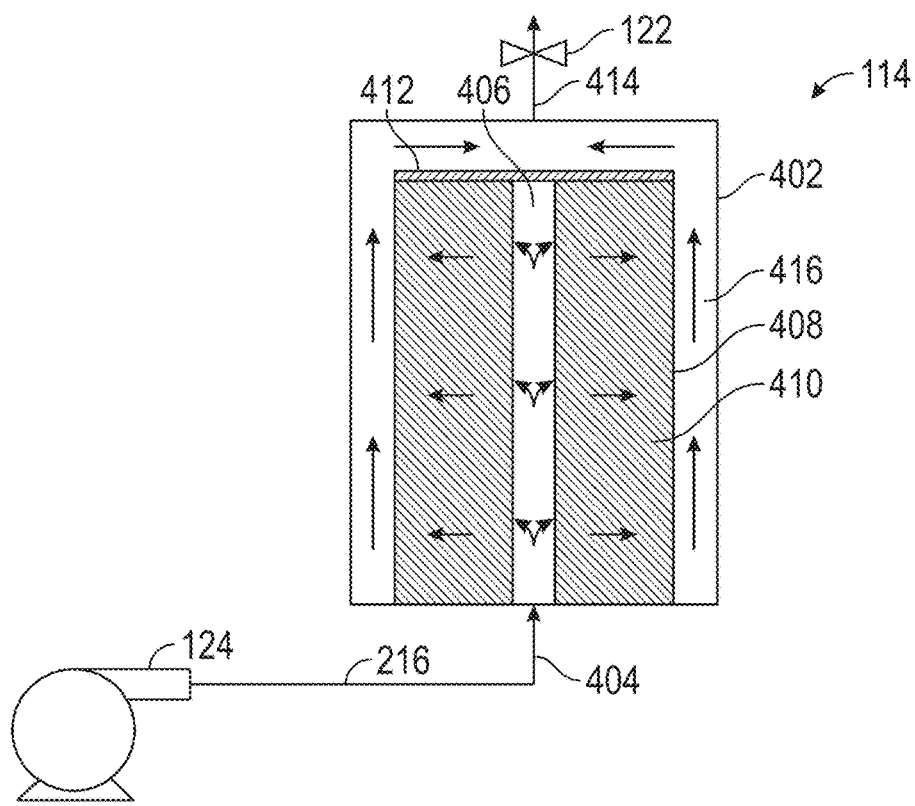
FIG. 3D is another schematic depiction of another embodiment of the heat exchanger.

FIG. 3D is another embodiment of a schematic depiction of the heat exchanger when it is deployed in the bottom-to-top, inside-out flow configuration. The polymer solution enters at the inlet port 404 and is transported to the central passage 406. From the central passage 406, the solution is transported to the radially extending conduits 410 located in the plurality of plates 408. After exiting the radially extending conduits 410, the polymer solution travels through the annular space 416 and then exits the heat exchanger 114 via the outlet port 414.

The FIGS. 3A, 3B, 3C and 3D represent the portion 180 (shown in dotted lines) of the FIG. 2, which encompasses the pump 124, the first heat exchanger 114 and the first pressure regulation device 122. They can also represent the portion 182 (shown in dotted lines in the FIG. 2) which encompasses a pump 125, and an optional second flat plate heater 115 and an optional second pressure regulation device 123 that are disposed downstream of the second devolatilization device 110 and upstream of the third devolatilization device 112.

The pressure in the first heat exchanger 114 is simultaneously reduced from 50 to 250 kgf/cm$^2$ to 40 to 200 kgf/cm$^2$, while retaining the polymer solution in a single phase. The first heat exchanger 114 facilitates a pressure drop in the polymer solution of 5 to 50 kgf/cm$^2$ from the inlet port to the outlet port.

In an embodiment, the polymer solution is retained in a liquid phase during its residence in the first heat exchanger 114. The polymer solution has a solution viscosity of 1,000 to 2,000,000 centipoise, preferably 50,000 to 1,000,000 centipoise, and more preferably 100,000 to 600,000 centipoise (measured as detailed above) at the inlet port of 404 the first heat exchanger 114.

The polymer solution leaving the first heat exchanger 114 then enters a first pressure regulation device 122, which enables a reduction in pressure to facilitate flashing off of additional solvent from the polymer solution. In an embodiment, the first pressure regulation device 122 is a valve or a nozzle that facilitates a pressure reduction from 20 to 70 kgf/cm$^2$ to 0.1 to 1.0 kgf/cm$^2$ in the second devolatilization device 110. In a preferred embodiment, the first pressure regulation device 122 is a valve.

The second devolatilization vessel 110 may also operate adiabatically to facilitate solvent removal from the polymer solution. The polymer solution entering the second devolatilization vessel 110 may optionally enter through a distributor 130 to facilitate mass transfer area for devolatilization. Details of the distributor are provided in U.S. Provisional Patent Application having Ser. No. 62/678,607, filed concurrently herewith, the entire contents of which are incorporated herein by reference.

Figure 3E:
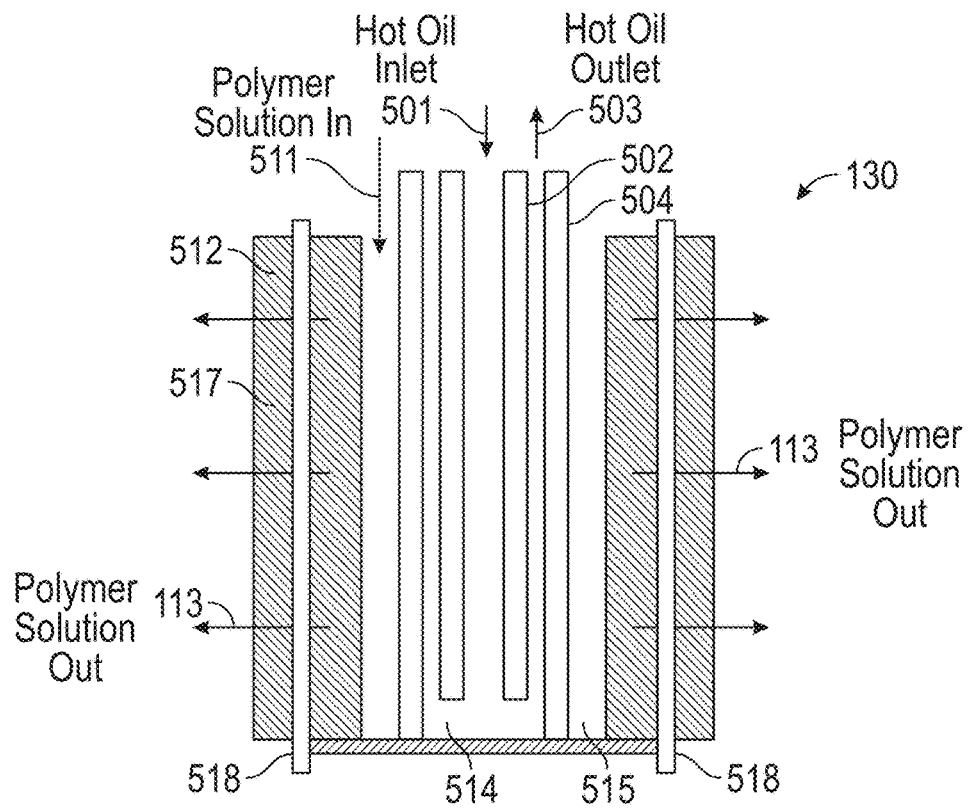
FIG. 3E is a schematic depiction of one embodiment of the distributor.

An exemplary distributor 130 depicted in the FIG. 3E comprises two conduits 502 and 504 arranged in a concentric configuration. The inner conduit 502 contains an inlet port 501 for charging a heating fluid into the distributor 130, while the outer conduit 504 forms a first annular space 514 through which the heating fluid flows after travelling through the inner conduit 502. The outer conduit 504 contains an outlet port 503 through which the spent heating fluid exits the distributor 130.

A plurality of plates 512 is concentrically disposed around the first annular space 514 to define a second annular space 515 from top to bottom of the distributor 130. The annular space 515 can have the same width or it can have a decreasing or increasing width from the top to the bottom of the distributor, as depicted in an exemplary design shown in FIG. 3F.

Figure 3F:
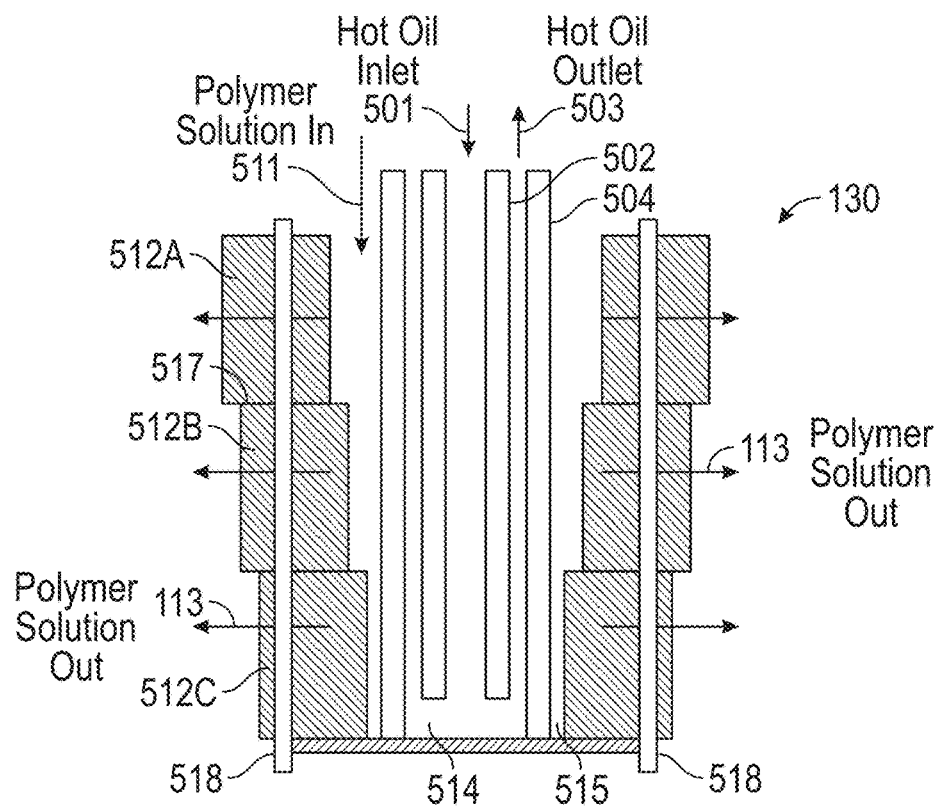
FIG. 3F is a schematic depiction of another embodiment of the distributor.

In FIG. 3F, the plurality of plates form stacks in such a manner so as to decrease the annular space 515 from the inlet of the polymer 511 towards the bottom of the distributor. In other words, the stack diameter decreases from top to bottom of the distributor.

Although FIG. 3F depicts 3 such stacks of plates, multiple stacks can be used. An exemplary distributor 130 depicted in the FIG. 3F comprises two conduits 502 and 504 arranged in a concentric configuration. The inner conduit 502 contains an inlet port 501 for charging a heating fluid into the distributor 130, while the outer conduit 504 form a first annular space 514 through which the heating fluid flows after travelling through the inner conduit 502. The outer conduit 504 contains an outlet port 503 through which the spent heating fluid exits the distributor 130.

A plurality of plate stacks 512A, 512B and 512C (or a single set of plate stacks 512 as seen in the FIG. 3E) are concentrically disposed around the outer conduit 504 to form a second annular space 515 from top to bottom of the distributor 130. In the FIG. 3E, where all plates have the same inner diameter, this second annular space has a constant cross-sectional area from the top to bottom of the distributor. In the FIG. 3F, where each succeeding plate stack (from top to bottom) has a narrower inner diameter than the preceding plate stack, this second annular space has a cross-sectional area that narrows from top to bottom.

Each plate stack comprises a plurality of plates, where the plurality of plates further define a plurality of conduits 517 that permit flow of the polymer solution from the second annular space to the outer periphery of the plate stacks. Supporting rods or pipes 518 are used to secure the plurality of plates in position.

Each conduit has a varying width over its length and extends radially outwards from the second annular space 515 to the outer periphery of the plates. The polymer solution travels from an inlet port 511 in the distributor 130 through the second annular space 515 and into the conduits 517. The conduits 517 in the stacked plates facilitate polymer solution distribution and also provide a mass transfer area to the polymeric solution to produce polymeric foam bubbles so that diffusion of the volatile compounds takes place efficiently from the polymer into the bubbles. Once the bubbles grow to a sufficient size, they coalesce and burst, allowing for the volatile compounds to be released from the polymer. The polymer and the volatile compounds thus separate into phases—a vapor phase that contains volatiles and a liquid (or melt) phase that contains polymer or concentrated polymer solution at higher polymer concentration that the stream entering distributor 130.

The plurality of plates further defines a plurality of conduits 517 that permit flow of the polymer solution from the second annular space 515 to the outer periphery of the plurality of plates. Supporting rods or pipes 518 are used to secure the plurality of plates in position.

Each conduit can have the same or it can have a varying width over its radial length and extends radially outwards from the second annular space 515 to the outer periphery of the plates. The polymer solution travels from an inlet port 511 in the distributor 130 through the second annular space 515, into the conduits 517 and out of the periphery of the plurality of plates through the outlet ports 113.

The conduits 517 in the plurality of plates facilitate polymer solution distribution and also provide a mass transfer area to the polymeric solution to produce polymeric foam bubbles so that diffusion of the volatile compounds takes place efficiently from the polymer into the bubbles. Once the bubbles grow to a sufficient size, they coalesce and burst, allowing for the volatile compounds to be released from the polymer. The polymer and the volatile compounds thus separate into phases—a vapor phase that contains volatiles and a liquid (or melt) phase that contains polymer or concentrated polymer solution at higher polymer concentration that the stream entering distributor 130.

In one embodiment, the polymer solution entering the second devolatilization vessel 110 (See FIG. 2) is at a temperature of 220 to 280° C., preferably 240 to 260° C. In one embodiment, the pressure in the second devolatilization vessel is maintained at 0.1 to 0.5 kgf/cm$^2$ permitting the solvent to flash off and to increase the solids content in the polymer solution to 90 to 97 wt %, preferably 92 to 95 wt %, based on the total weight of the polymer solution at the exit of the second devolatilization vessel 110. The temperature of the polymer solution leaving the second devolatilization vessel 110 is 180° C. to 240° C., preferably 190 to 230° C.

With reference now once again to the FIG. 2, the polymer solution is discharged from the second devolatilization device 110 via stream 218 to the third devolatilization device 112. A second positive displacement pump 125, an optional second flat plate heater 115 and an optional second pressure regulation device 123 are disposed downstream of the second devolatilization device 110 and upstream of the third devolatilization device 112. The second positive displacement pump 125, the optional second flat plate heater 115 and the optional second pressure regulation device 123 function in the same manner as the first positive displacement pump 124, the optional first flat plate heater 114 and the optional first pressure regulation device 122 respectively. An increase in pressure (brought about by the second positive displacement pump 125) and temperature (brought about by the second heat exchanger 115) is controlled by the pressure regulation device 123, which facilitates keeping the polymer solution in single phase in the heat exchanger 115. The pressure regulation device 123 further facilitates devolatilization of volatiles from the polymer solution when it is adiabatically flashed in the third devolatilization vessel 112 to increase the polymer concentration to an amount greater than 99.5 wt %, based on the total weight of the polymer solution.

The third devolatilization vessel 112 may contain a distributor 131 that is operated at a temperature and pressure effective to facilitate a separation of the polymer from the solvent in the polymer solution. The distributor 131 is similar in design to that of distributor 130 (See FIGS. 3E and 3F). The distributor facilitates separation of the solvent from the polymer for higher viscosity polymer solutions. The viscosity of the polymer solution entering the distributor is 100,000 to 3,000,000 centipoise.

In an embodiment, the polymer solution in the third devolatilization vessel 112 may be also subjected to adiabatic flashing. The third devolatilization vessel 112 receives the polymer solution at a temperature of 180 to 260° C. and at a pressure of 10 to 140 kgf/cm$^2$, so that the polymer solution is kept a single liquid phase. The pressure of the polymer solution in the third devolatilization vessel is then reduced to 0.001 to 0.050 kgf/cm², preferably 0.005 to 0.015 kgf/cm². The reduction in pressure facilitates a further increase in the solids content for the polymer solution. The solids content of the polymer solution emanating from the third devolatilization vessel is greater than 99.8 wt %, preferably greater than 99.9 wt %, and more preferably greater than 99.99 wt %, based on the total weight of the polymer solution. In an embodiment, the amount of volatile organic content in the polymer obtained after the third devolatilization vessel 112 is less than 300 parts per million. In other words, the polymer emanating from the third devolatilization vessel 112 is substantially free from volatiles and contains only traces of volatiles (e.g., monomers, unreacted byproducts, solvent(s), and the like).

A positive displacement pump 133 may be used to pump the polymer via stream 220 from the third devolatilization vessel 112 to a granulation and solidification device such as a pelletizer (not shown) where the polymer is pelletized and packaged for transportation.

Vapors generated in the three devolatilization vessels 108, 110, and 112 are cooled and transported to solvent recovery and recycling system 117 via streams 222, 219, and 224. A small purge stream 119 is used to keep impurities in the process to a limited level. The liquid stream from the solvent recovery and recycling system 117 is recycled to the reactor system 102 via stream 314.

Figure 4:
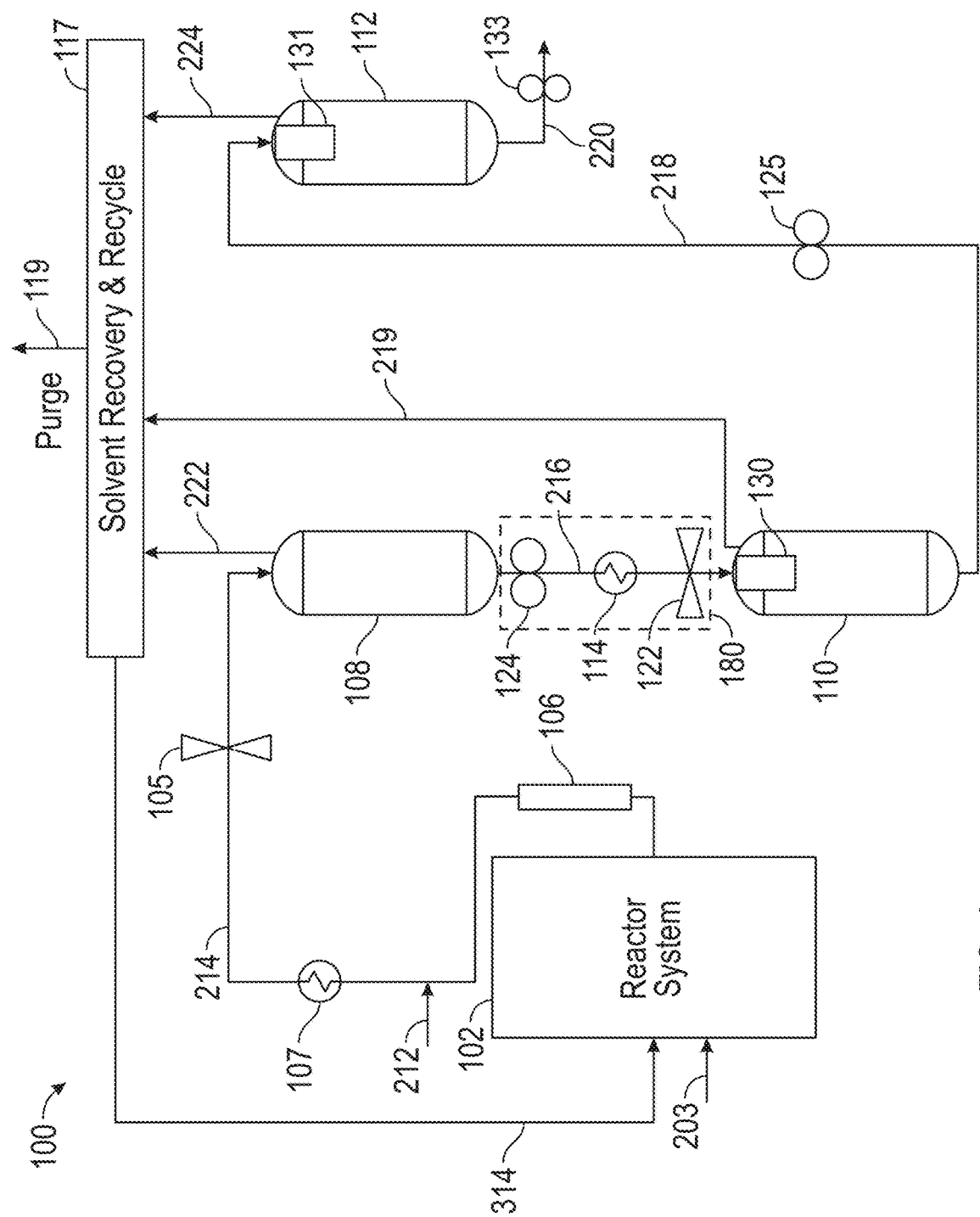
FIG. 4 is another schematic diagram of an exemplary solution polymerization system used for separating polymer from a solvent.

The FIG. 4 depicts an embodiment of the system previously depicted in the FIG. 2. In this embodiment depicted in the FIG. 4, the reactor system 102 comprises at least two reactors, all of which are in in fluid communication with the devolatilization system comprising the three devolatilization vessels 108, 110 and 112. The reactors of the reactor system 102 are in fluid communication with each other and may be either in a series or in a parallel configuration. In an embodiment, the reactors in the reactor system 102 can be continuous stirred tank reactors (CSTRs), loop reactors (e.g., single loop reactor, double loop reactor), boiling reactors, and can be single or multi-stage reactors. In an embodiment, the reactors may be the same type of reactor. In another embodiment, the reactors may be of different types. In an embodiment, at least one of the reactors is an adiabatic reactor, i.e., no heat is supplied to the reactor during the reaction. In an embodiment, the process may employ multiple catalysts in one or multiple reactors. In an embodiment, at least one of the reactors is a loop reactor with exchangers that can be shell and tube, shell and tube with mixing inserts, or flat plate coolers, all of which are described above.

Disposed between the reactor system 102 and the first devolatilization vessel 108 is an optional tubular reactor 106, which is in fluid communication with the reactor system 102. The tubular reactor 106 may optionally receive additional monomer, comonomer, hydrogen and catalyst. The tubular reactor 106 further increases the polymer concentration via further reaction of unreacted or optionally the additional monomer and/or comonomer.

A catalyst neutralizing agent is added to the polymer solution downstream of the optional tubular reactor system 106 exit to prevent any further polymerization from occurring. The catalyst neutralizing agent is added at the catalyst neutralizing agent station 212, which lies upstream of a heat exchanger 107 and downstream of the tubular reactor 106. The heat exchanger 107 lies downstream of the reactor 106 while the three devolatilization vessels 108, 110 and 112 (which are in serial fluid communication with each other) lie downstream of the heat exchanger 107. In an embodiment, the heat exchanger 107 is a shell and tube heat exchanger. In another embodiment, the heat exchanger 107 is a flat plate heat exchanger. In one embodiment, the heat exchanger 107 is used primarily for non-steady-state operations.

The pressure regulator 105 keeps the polymer solution in the liquid phase up to the first devolatilization unit 108.

Disposed between the first devolatilization vessel 108 and the second devolatilization vessel 110 along line 216 lies the first positive displacement pump 124, the first flat plate heater 114 and the first pressure regulation device 122. The system depicted in this embodiment contains the positive displacement pump 124 and the heat exchanger 114 located between the first and second devolatilization vessels. The polymer solution entering the second devolatilization vessel 110 may optionally enter through a distributor 130 to facilitate mass transfer area for devolatilization. The second devolatilization vessel 110 is in direct fluid communication with the third devolatilization vessel 112 via the positive displacement pump 125. The system depicted in this embodiment does not contain the heat exchanger 115 or the pressure regulator 123 (as depicted in the FIG. 2). The system contains the distributor 131.

Each successive devolatilization vessel in the series operates at a lower pressure than the preceding devolatilization vessel. Each devolatilization vessel facilitates an adiabatic flashing of the solvent from the polymer solution leaving behind a polymer solution that has a higher polymer concentration than that prior to the flashing. The vapor streams leaving devolatilizers 108, 110 and 120 are as described above and will not be detailed here again in the interests of brevity.

In one embodiment, in one manner of using the system 100 depicted in the FIG. 4, ethylene monomer, comonomers, catalysts, co-catalysts, activators and hydrogen streams are introduced into the reactor system 102, typically dissolved in solvent.

The polymer solution from the reactor system 102 (or from the tubular reactor 106) and after catalyst deactivation (at the catalyst neutralization station 212) is discharged to the heat exchanger 107. The polymer solution emanating from the reactor system 102 (or from the tubular reactor 106) is at a temperature of 180 to 240° C., preferably at 200 to 220° C. The heat exchanger 107 increases the temperature of the polymer solution to 220 to 280° C., preferably to 240 to 260° C. The concentration of the polymer in the polymer solution after the heat exchanger 107 is 20 to 30 wt %, preferably 22 to 28 wt %, based on the total weight of the polymer solution. The polymer solution remains in the liquid phase up to the exit of the heat exchanger 107 as the pressure in the unit operations up to that point is regulated by a pressure regulation device 105. In an embodiment, the pressure regulation device 105 is a valve. The polymer solution may be in two liquid phases in the heat exchanger 107, but it is not allowed to contain a liquid phase and a vapor phase.

The polymer solution is then discharged to the first devolatilization vessel 108, where its pressure is reduced to 2 to 3 kgf/cm². The reduction in pressure promotes flashing of the solvent and increases the polymer concentration in the polymer solution. The polymer solution emanating from the first devolatilization vessel 108 has a polymer concentration of 50 to 70 wt %, preferably 55 to 65 wt %, based upon the total weight of the polymer solution.

The polymer solution emanating from the first devolatilization vessel 108 is pumped by the positive displacement pump 124 into the flat plate heater 114, where its temperature is increased and pressure reduced all whilst maintaining it in a single phase.

The polymer solution is then discharged to the second devolatilization vessel 110 (which may contain a distributor 130), where its pressure is reduced to 0.1 to 1.0 kgf/cm$^2$, preferably 0.2 to 0.5 kgf/cm$^2$. The flashing in the second devolatilization vessel 108 increases the polymer concentration to 90 to 98 wt %, preferably 95 to 97 wt %, based on the total weight of the polymer solution.

The polymer solution is then discharged to the third devolatilization vessel 112 (which may contain a distributor 131), where its pressure is further reduced to 0.004 to 0.030 kgf/cm$^2$, preferably 0.006 to 0.015 kgf/cm$^2$. Polymer containing less than 300 parts per million of volatiles is then pumped via pump 133 to the pelletizer via stream 220.

Vapors emanating from each of the devolatilization vessels are processed as detailed above. Most of the condensed vapors are recycled back to the reactor system 102 via stream 314.

Figure 5:
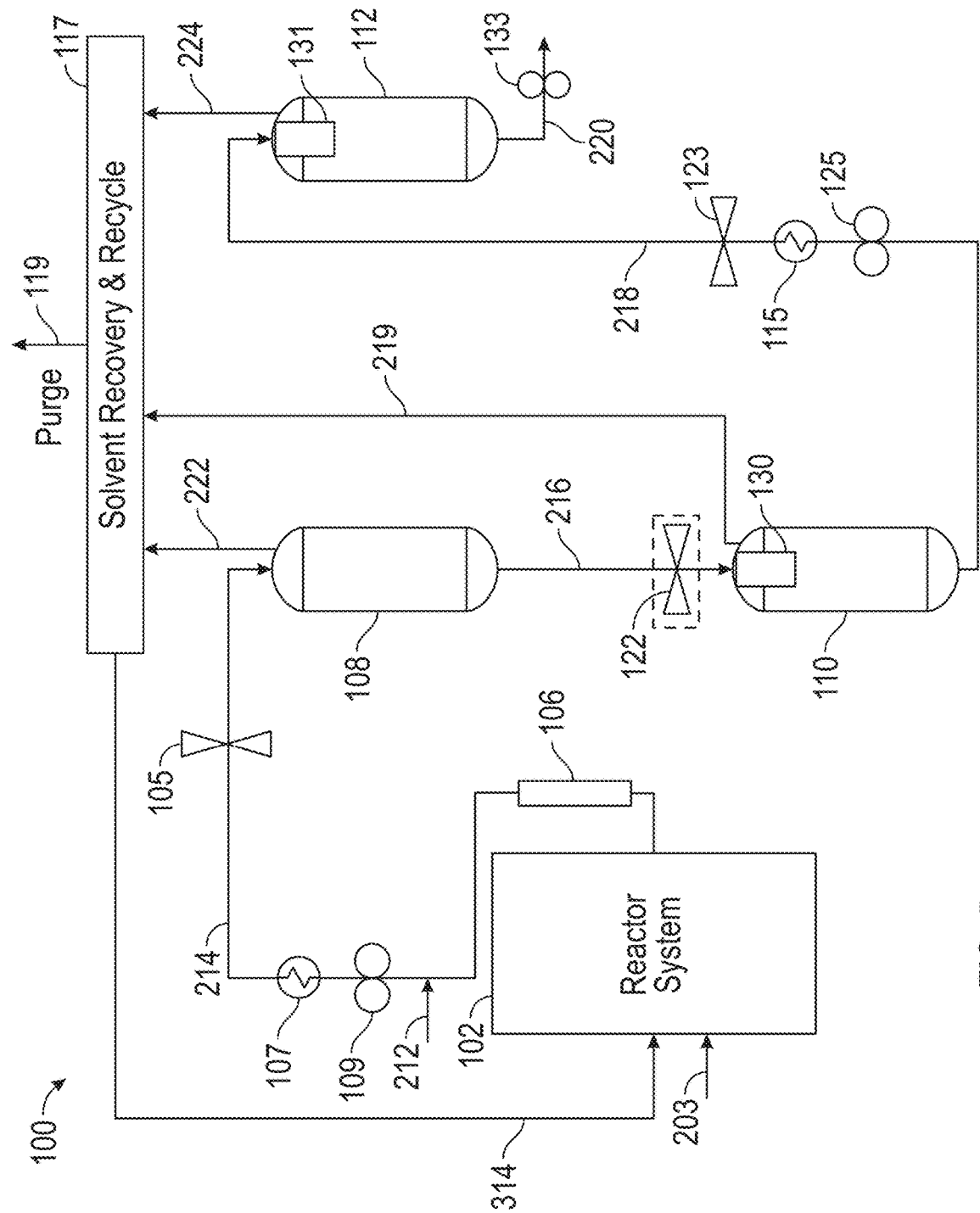
FIG. 5 is another schematic diagram of an exemplary solution polymerization system used for separating polymer from a solvent.

The FIG. 5 depicts another embodiment of the system depicted in the FIG. 2. In this embodiment, the higher polymer solution pressure in the first devolatilization vessel permits a greater gas density, which results in a smaller volumetric flow that allows for smaller sized devolatilization vessel for the flashing. The higher pressure also permits low molecular weight gases to be injected into the recycle solvent stream without the need for a recycle gas compressor. Because of the high pressure on the polymer solution, a positive displacement pump is not used to transfer the polymer solution to the second devolatilization stage from the first devolatilization stage. The vapor flow rate in the second devolatilization vessel is substantially reduced allowing for a smaller vessel or higher production rate through the same sized vessel.

With reference to the FIG. 5, in this embodiment, the polymer solution in the heat exchanger 107 is heated to up to 275° C., which is greater than the temperature of 240 to 260° C. used in the previous option. In this option, the polymer solution in the heat exchanger 107 is heated to 250° C. to 275° C. A positive displacement pump 109 is incorporated into this design to provide the elevated pressure to maintain the polymer solution in a liquid phase as the polymer solution is heated to the higher temperature (275° C.).

A pressure regulation device 105 is used to regulate the pressure through the heat exchanger 107. In an embodiment, the pressure regulation device 105 is a valve. The polymer solution may be in two liquid phases in the heat exchanger 107, but it is not allowed to contain a liquid phase and a vapor phase. This heating allows for enough solvent to be vaporized in the first devolatilization vessel 108 to produce a polymer solution of at least 50 wt % polymer at an even higher pressure than the pressure used in the system operation as depicted in the FIG. 5.

In this embodiment too, at least one devolatilization vessel is located at a higher elevation that the other devolatilization vessels to use the differential pressure (between the vessels) and gravity to facilitate transportation of the polymer solution from one devolatilization vessel to another.

With reference now to the FIG. 5, the system 100 comprises a reactor system 102 as described in the FIG. 2 above. Disposed between the reactor system 102 and the first devolatilization vessel 108 is an optional tubular reactor 106, which is in fluid communication with the reactor system 102. The tubular reactor 106 may optionally receive additional monomer, comonomer, hydrogen and catalyst. The tubular reactor 106 further increases the polymer concentration via further reaction of unreacted or optionally the additional monomer and/or comonomer. The tubular reactor is in fluid communication with the devolatilization system comprising the three devolatilization vessels 108, 110 and 112 via the positive displacement pump 109 and the heat exchanger 107.

In an embodiment, the reactor system 102 comprises at least one reactor, which can be adiabatic or isothermal, a continuous stirred tank reactor, a boiling bed reactor or a tubular reactor. When more than one reactor is used, combinations of these reactor types may be used. When more than one reactor is used, the multiple reactors may be in either a series or a parallel configuration. An example of the reactor system 102 (reactor types, configuration, details on the heat exchangers, and the like) is described above in the FIGS. 2 and 4. The positive displacement pump 109 and the heat exchanger 107 lie downstream of the reactor system 102 (or the tubular reactor 106) while the three devolatilization vessels 108, 110 and 112 (which are in serial fluid communication with each other) lie downstream of the pressure control valve 105. In an embodiment, the heat exchanger 107 is a shell and tube heat exchanger. In another embodiment, the heat exchanger 107 can be a plate and frame exchanger. In another embodiment, the heat exchanger 107 can be a flat plate heat exchanger.

Disposed between the first devolatilization vessel 108 and the second devolatilization vessel 110 along line 216 lies an optional first pressure regulation device 122. In an embodiment, the first optional pressure regulation device 122 is a valve that facilitates maintaining pressure in the first devolatilization vessel 108.

The first devolatilization vessel 108 lies at a higher elevation that the second devolatilization vessel 110. This arrangement permits gravity to facilitate feeding the polymer solution to the second devolatilization vessel 110 from the first devolatilization vessel 108. It also reduces or obviates the need for using a positive displacement pump between the first devolatilization vessel and the second devolatilization vessel.

The second devolatilization vessel 110 may be fitted with the distributor 130. The distributor 130 is located at the top of the vessel and facilitates efficient separation of the solvent from the polymer in the second devolatilization vessel 110.

The positive displacement pump 125 located downstream of the devolatilization vessel 110 pushes the polymer solution from the second devolatilization vessel 110 through the heat exchanger 115. In an embodiment, the heater 115 can be a flat plate heater. The pressure regulation device 123 controls the pressure in the heater 115 so as to keep it single phase (liquid).

The second devolatilization vessel 110 is in direct fluid communication with the third devolatilization vessel 112. The third devolatilization vessel 112 may also contain a distributor 131 (that ensures separation of the solvent from the polymer) located at the top of the vessel. In another embodiment, the heater 115, pressure regulation device 123 and the distributor 131 are combined into a single piece of equipment. In other words, the heater 115, pressure regulation device 123 and the distributor 131 may be located inside a single vessel (not shown). In an embodiment, if the distributor 131 is present in the devolatilization vessel 112, then the heat exchanger 115 and the pressure regulator 123 may be eliminated from the design and the distributor 131 will also function as the exchanger and the minimum pressure maintaining device.

The solvent and monomer recycling system for this design is the same as that detailed above in FIGS. 2 and 4. Located downstream of the third devolatilization vessel 112, there is a stream 220 that comprises a pelletizer (not shown) for pelletizing or granulating the polymer discharged from the third devolatilization vessel 112. The polymer in stream 220 may contain different amounts of volatiles depending upon the pressure used in the third devolatilization vessel 112. In an embodiment, the polymer in stream 220 may contain less than 300 parts per million of volatiles, preferably less than 200 parts per million of volatiles, and more preferably less than 100 parts per million of volatiles.

In one embodiment, on one manner of using the system 100 depicted in the FIG. 5, ethylene monomer, comonomers, catalysts, co-catalysts, activators and hydrogen streams are introduced into the reactor system 102, typically dissolved in solvent.

The temperature of the polymer solution emanating from the reactor system 102 is in the range of 140 to 230° C. The polymer concentration in the polymer stream emanating from the reactor system 102 is 15 to 30 wt %, preferably 20 to 25 wt %, based on the total weight of the polymer solution.

A catalyst neutralizing agent is added to the polymer solution via the catalyst neutralization station 212. The neutralizing agent prevents any further polymerization from occurring.

The polymer stream is then pumped by the positive displacement pump 109 to the heat exchanger 107 where its temperature is raised. The positive displacement pump 109 serves to increase the pressure of the polymer solution so that the solvent and other volatiles can be flashed off in successive flashing steps conducted in the devolatilization vessels 108, 110 and 112. The positive displacement pump 109 increases the pressure of the polymer solution to 70 to 130 kgf/cm$^2$.

In an embodiment, the positive displacement pump 109 increases the pressure of a polymer solution to 75 kgf/cm$^2$. In yet another embodiment, the positive displacement pump 109 increases the pressure of a polymer solution to 120 kgf/cm$^2$.

The heat exchanger 107 increases the temperature of the polymer solution to 240 to 280° C., preferably 270° C.

The polymer solution then passes through the pressure regulator 105 and it is discharged to the first devolatilization vessel 108, where its pressure is reduced to 8 to 12 kgf/cm$^2$, preferably 10 kfg/cm$^2$. The reduction in pressure promotes flashing of the solvent and increases the polymer concentration in the polymer solution. The polymer solution emanating from the first devolatilization vessel 108 has a polymer concentration of 40 to 60 wt %, preferably 50 wt %, based upon the total weight of the polymer solution.

The polymer solution emanating from the first devolatilization vessel 108 is then discharged to the second devolatilization vessel 110. Flow from the first devolatilization vessel 108 to the second devolatilization vessel 110 occurs because of the pressure difference between the first and second devolatilization vessels and because of gravity. The pressure regulation device 122 is optional. The distributor 130 located in the second devolatilization vessel 110 ensures separation of the solvent from the polymer in the second devolatilization vessel 110.

In the second devolatilization vessel 110, the pressure is reduced to 0.1 to 1.0 kgf/cm$^2$, preferably 0.2 to 0.5 kgf/cm$^2$. The flashing in the second devolatilization vessel 108 increases the polymer concentration to 90 to 99 wt %, preferably 95 wt %, based on the total weight of the polymer solution. The temperature of the polymer stream exiting the second devolatilization vessel is 170° C. to 210° C., preferably 190° C.

The positive displacement pump 125 located downstream of the devolatilization vessel 110 pushes the polymer solution from the second devolatilization vessel 110 through the heat exchanger 115. The pressure regulation device 123 controls the pressure in the heater 115 so as to keep it single phase (liquid).

The polymer solution is then discharged to the third devolatilization vessel 112 (which contains a distributor 131, where its pressure is further reduced to 0.003 to 0.040 kgf/cm$^2$, preferably 0.010 kgf/cm$^2$). In other words, the third devolatilization vessel 112 is operated under vacuum. By varying the pressure in the third devolatilization vessel 112, the amount of volatiles contained in the polymer may be varied. For example, by maintaining a pressure of approximately 0.01 kgf/cm$^2$ in the third devolatilization vessel 112, polymer containing around 400 parts per million can be discharged to a pelletizer via stream 220. In another embodiment, by maintaining a pressure of approximately 0.003 kgf/cm$^2$ in the third devolatilization vessel 112, polymer containing around 100 parts per million can be discharged to a pelletizer via stream 220.

Condensed vapors from the devolatilization vessels 108, 110, and 112 are treated as detailed above and will not be repeated here in the interests of brevity.

The systems disclosed herein are advantageous in that higher polymer concentrations, polymers with higher molecular weights, and polymers with lower residual volatiles, can be manufactured at lower energy requirements by taking advantage of the lower pressure drop observed with flat plate exchangers, flashing at least two thirds of the solvent in the first devolatilization vessel (thus avoiding heating and then cooling the polymer solution), handling lower vapor loads in the devolatilization vessels due to their higher operating pressures, and using successively lower pressure flash vessels. The system is also advantageous in that it is flexible to be constructed according to the product needs; it requires lower capital investment than the competitive example; and leads to lower operating costs.

What is claimed is:

1. A system for solution polymerization comprising:
   a reactor system that is operative to receive at least one monomer in a solvent and to react the monomer to form a polymer;
   a plurality of devolatilization vessels located downstream of the reactor system, where each devolatilization vessel operates at a lower pressure than the preceding devolatilization vessel and wherein the plurality of devolatilization vessels receives a polymer solution from the reactor system; and
   a first heat exchanger disposed between two devolatilization vessels and in fluid communication with them, where the first heat exchanger has an inlet port temperature of 120° C. to 230° C., an outlet port temperature of 200° C. to 300° C., an inlet port pressure of 35 to 250 kgf/cm$^2$ and an outlet port pressure of 20 to 200 kgf/cm$^2$; and wherein the polymer solution remains in a single phase during its residence in the first heat exchanger.

2. The system of claim 1, further comprising a distributor disposed in at least one devolatilization vessel, wherein the distributor comprises:
   a first conduit; where the first conduit has an inlet port for charging a heating fluid into the distributor;

a second conduit; where the first conduit lies inside the second conduit to define a first annular space therebetween; where the second conduit has an exit port for removing the heating fluid from the distributor; and a plurality of plate stacks disposed around the second conduit to define a second annular space from top to bottom of the distributor; where each plate stack comprises a plurality of plates; where the plurality of plates further define a plurality of conduits, each conduit having a varying width over its length and extending radially outwards from a central passage, where the plurality of conduits is in fluid communication with the second annular space; and where the distributor is operated at a pressure and a temperature effective to promote separation of a solvent from a polymer solution during transport of the polymer solution through the distributor.

3. The system of claim 2, wherein each successive stack in the plurality of plate stacks has a smaller inner diameter than a preceding stack from top to bottom.

4. The system of claim 1, wherein the reactor system comprises a plurality of reactors and where at least one reactor operates under isothermal conditions or under adiabatic conditions.

5. The system of claim 1, further comprising a tubular reactor in fluid communication with the reactor system; wherein the tubular reactor may optionally receive additional monomer, comonomer, and catalyst and wherein the tubular reactor further increases the polymer concentration via further reaction of unreacted or optionally the additional monomer and/or comonomer.

6. The system of claim 1, further comprising a positive displacement pump located downstream of the reactor system and in fluid communication with the reactor system, where the positive displacement pump increases a stream pressure to 50 to 150 $kgf/cm^2$.

7. The system of claim 6, further comprising a heat exchanger disposed between the positive displacement pump and the first devolatilization vessel and in fluid communication with the first devolatilization vessel, where the heat exchanger has an inlet port temperature of 100° C. to 230° C., an outlet port temperature of 230° C. to 280° C., an inlet port pressure of 40 to 170 $kgf/cm^2$ and an outlet port pressure of 30 to 150 $kgf/cm^2$, where the polymer solution is kept in one or two liquid phases.

8. The system of claim 1, further comprising a pressure regulating device disposed between the first heat exchanger and one devolatilization vessel of the plurality of devolatilization vessels, where the pressure regulating device ensures the polymer solution is kept in one or two liquid phases in the first heat exchanger and facilitates removal of a portion of the solvent in a succeeding devolatilization vessel.

9. The system of claim 1, wherein the reactor system comprises a loop reactor or a continuous stirred tank reactor that operates at a pressure of greater than 40 $kgf/cm^2$ and at a temperature of 130 to 210° C.

10. The system of claim 1, further comprising a positive displacement pump located between a first and second devolatilization vessel of the plurality of devolatilization vessels and in fluid communication with them, where the positive displacement pump has an inlet pressure of 2 to 12 $kgf/cm^2$ and an outlet port pressure of 35 to 150 $kgf/cm^2$.

11. The system of claim 1, wherein the polymer solution leaving the reactor system has a polymer concentration of 10 to 40 percent by weight, where all the weight percent values are based on a total weight of the polymer solution.

12. The system of claim 1, wherein the plurality of devolatilization vessels comprises at least two devolatilization vessels and where the first heat exchanger is disposed between a first devolatilization vessel and a second devolatilization vessel.

13. The system of claim 12, wherein a second heat exchanger is disposed between the second devolatilization vessel and a third devolatilization vessel.

14. The system of claim 12, wherein a pressure in the first devolatilization vessel is maintained at 2 to 12 $kgf/cm^2$ and a polymer concentration in a polymer solution leaving the first devolatilization vessel is 50 to 70 wt %, based on a total weight of the polymer solution.

15. The system of claim 14, wherein a pressure in the second devolatilization vessel is 0.1 to 1.0 $kgf/cm^2$ and the polymer concentration in the polymer solution is increased to at least 90 wt %, based on a total weight of the polymer solution; where the second devolatilization vessel lies downstream of the first devolatilization vessel.

16. The system of claim 13, wherein a pressure in the third devolatilization vessel is 0.001 to 0.040 $kgf/cm^2$ and the polymer concentration in the polymer solution is increased to at least 99.8 wt %, based on a total weight of the polymer solution.

17. The system of claim 2, wherein the distributor, the heat exchanger and a pressure regulating device are combined into a single piece of equipment-.

18. A method comprising:
charging a reactor system with a monomer, a solvent and a catalyst;
reacting the monomer to form a polymer; wherein the reaction to form the polymer is conducted either adiabatically or isothermally and wherein the polymer is dispersed in a polymer solution;
discharging the polymer solution from the reactor system to a plurality of devolatilization vessels located downstream of the reactor system; wherein each devolatilization vessel operates at a lower pressure than the preceding devolatilization vessel; and
discharging the polymer solution from at least one devolatilization vessel to a first heat exchanger; and
heating the polymer solution in the heat exchanger; where the heat exchanger receives the polymer solution at an inlet port temperature of 120° C. to 230° C., an outlet port temperature of 200° C. to 300° C., an inlet port pressure of 35 to 250 $kgf/cm^2$ and an outlet port pressure of 20 to 200 $kgf/cm^2$; and wherein the polymer solution remains in a single phase during its residence in the first heat exchanger.

19. The method of claim 18, further comprising:
separating the polymer from the polymer solution in a distributor contained in at least one devolatilization vessel; wherein the distributor comprises:
a first conduit; where the first conduit has an inlet port for charging a heating fluid into the distributor;
a second conduit; where the first conduit lies inside the second conduit to define a first annular space therebetween; where the second conduit has an exit port for removing the heating fluid from the distributor;
a plurality of plate stacks disposed around the second conduit to define a second annular space from top to bottom of the distributor; where each plate stack comprises a plurality of plates; where the plurality of plates further define a plurality of conduits, each conduit having a varying width over its length and extending radially outwards from the central passage, where the plurality of conduits is in fluid communication with the second annular space; and where the distributor is operated at a pressure and a temperature effective to promote separation of a solvent from the polymer solution during transport of the polymer solution through the distributor; and discharging a polymer from the plurality of devolatilization vessels to a pelletization, granulation or solidification device; where the polymer contains less than 300 parts per million of volatiles.

20. The method of claim 18, further comprising discharging the polymer solution to a tubular reactor located downstream of the reactor system and upstream of the plurality of devolatilization vessels and increasing the polymer solution temperature and polymer concentration in the tubular reactor.

* * * * *